United States Patent

Shiomi et al.

[11] Patent Number: 5,264,152
[45] Date of Patent: Nov. 23, 1993

[54] OPTICALLY ACTIVE COMPOUND; LIQUID CRYSTAL COMPOSITION AND LIQUID CRYSTAL DEVICE COMPRISING SAME

[75] Inventors: Makoto Shiomi, Tenri; Mitsuhiro Koden; Tomoaki Kuratate, both of Nara; Fumiaki Funada, Yamatokoriyama, all of Japan

[73] Assignee: Sharp Kabushiki Kaisha, Osaka, Japan

[21] Appl. No.: 866,117

[22] Filed: Apr. 7, 1992

Related U.S. Application Data

[63] Continuation of Ser. No. 471,431, Jan. 29, 1990, abandoned.

[30] Foreign Application Priority Data

Jan. 31, 1989 [JP] Japan ................. 1-23358
Jul. 31, 1989 [JP] Japan ................. 1-200045
Sep. 22, 1989 [JP] Japan ................. 1-247716

[51] Int. Cl.$^5$ ............. C09K 19/20; C09K 19/34; C07C 69/76; C07C 69/74
[52] U.S. Cl. ............. 252/299.67; 252/299.01; 252/299.63; 252/299.66; 560/8; 560/55; 560/59; 560/62; 560/64; 560/65; 560/100; 560/102; 560/118; 560/121; 560/123; 560/124
[58] Field of Search .............. 252/299.01, 299.61, 252/299.62, 299.63, 299.64, 299.65, 299.66, 299.1; 560/9, 55, 59, 61, 64, 65, 102, 118, 121, 123, 124

[56] References Cited

U.S. PATENT DOCUMENTS 4,921,632 5/1990 Nakamura et al. ............ 252/299.1
4,988,458 1/1991 Heppke et al. .............. 252/299.63

FOREIGN PATENT DOCUMENTS 0196070 10/1986 European Pat. Off. .
0301511 2/1989 European Pat. Off. .
3534777 4/1987 Fed. Rep. of Germany .
1-139551 6/1989 Japan .
2-69428 3/1990 Japan .

OTHER PUBLICATIONS

Yoshino et al., Chem. Abstract 111:31748q (1988) (JP-A-63-3-7-837).

Goodby et al., "Some novel ferroelectric . . . ", *Liq. Crys. & Ordered Fluids*, 4 (1984), pp. 1–33.
Clark et al., "Submicrosecond bistable . . . ", *Appl. Phys. Lett.*, 36, pp. 899–900 (1980).

*Primary Examiner*—Robert L. Stoll
*Assistant Examiner*—Shean C. Wu
*Attorney, Agent, or Firm*—Birch, Stewart, Kolasch & Birch

[57] ABSTRACT

An optically active compound represented by the formula (I):

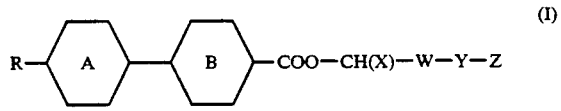

wherein R is a straight or branched chain alkyl or alkoxy group having 1 to 15 carbon atoms,

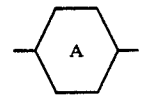

is a 1,4-cyclohexylene or 1,4-phenylene group,

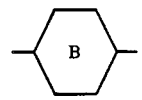

is a 1,4-phenylene or 3-fluoro-1,4-phenylene group, X is a mono-, di- or tri-fluoromethyl group, W is a straight or branched chain or cyclic alkylene group having 1 to 16 carbon atoms or a straight or branched chain alkenylene group having 2 to 16 carbon atoms, Y is a bond or —COO—, and Z is a straight or branched chain alkyl group having 1 to 8 carbon atoms, a phenyl group or a hydrogen atom, which is useful as a component of ferroelectric liquid crystal compositions or as a device utilizing said composition.

17 Claims, 4 Drawing Sheets

OPTICALLY ACTIVE COMPOUND, LIQUID CRYSTAL COMPOSITION AND LIQUID CRYSTAL DEVICE COMPRISING SAME

This application is a continuation of application Ser. No. 07/471,431 filed on Jan. 29, 1990, now abandoned.

BACKGROUND OF THE INVENTION

1. Field of the Invention

The present invention relates to novel optically active compounds, ferroelectric liquid crystal compositions comprising the compound, and ferroelectric liquid crystal devices having a liquid crystal layer of the composition.

2. Description of the Prior Art

Liquid crystal display devices most widely used presently are those utilizing nematic phase but having the drawback that they are not adapted for large-capacity display, for example, with 1,000×1,000 lines. For instance, usually twisted nematic (TN) liquid crystal display devices decrease in contrast with an increase in the number of lines, so that it is practically impossible to fabricate contrasty large-capacity liquid crystal devices of this type with 1,000×1,000 lines. To overcome the drawback of TN liquid crystal display devices, supertwisted nematic (STN) liquid crystal display devices and double supertwisted nematic (DSTN) liquid crystal display devices have been developed, whereas these devices still have the drawback of decreasing in contrast and in the speed of response with increasing number of lines. Such devices presently available are therefore limited to a display capacity of about 1,000×800 lines when having 1/400 duty and adapted to be driven by the upward-downward divided method. On the other hand, the prior art has already provided liquid crystal display devices of the active matrix type wherein thin-film transistors (TFT) are arranged on a substrate. Although it is technically possible to give devices of this type a large display capacity, for example, of 1,000×1,000, these devices have the drawback of necessitating a long production process and being low in yield and therefore very costly to fabricate.

As promising means for overcoming the foregoing problems, ferroelectric liquid crystal display devices are proposed which operate on a different principle from the TN display device [see N. A. Clark et al., Appl. Phys. Lett., 36, 899(1980)]. The proposed device utilized the chiral smectic C phase, chiral smectic I phase of ferroelectric liquid crystals. The device can be given a great display capacity with an improved speed of response since the memory property of the crystals is utilized. Furthermore, the device can be produced at a low cost since there is not need to use active components such as thin-film transistors. The ferroelectric liquid crystal display device also has the advantage of being wide in field of view. Thus, the device appears very promising as a large-capacity display device having at least 1,000×1,000 lines.

The liquid crystal material for use in the ferroelectric liquid crystal display device wherein smectic C phase is utilized must of course exhibit smectic C phase over a wide temperature range around room temperature and needs to fulfill various other requirements.

First, the device for large-capacity display must have high-speed responsiveness, and from this viewpoint, the liquid crystal material needs to be highly amenable to spontaneous polarization and low in viscosity. Further to obtain satisfactory orientation and bistability when used for the liquid crystal cell, the liquid crystal material needs to exhibit the phase series of IAC (Isotropic-Smectic A-Smectic C) or INAC (Isotropic-Nematic-Smectic A-Smectic C), and the helical pitch of nematic phase and smectic C phase needs to be sufficiently larger than the cell length. It is also desired that the material be great in tilt angle which is relevant to the contrast and brightness of liquid crystal display.

At present, however, it is impossible for a single compound to fulfill all the desired requirements, so that a plurality of compounds are usually mixed together for use as a liquid crystal composition. To prepare a liquid crystal composition fulfilling the requirements for actual use, it is necessary to use numerous single liquid crystal compounds having a wide variety of properties. It is sometimes likely that compounds which per se exhibit no liquid crystal properties will be useful as components of the liquid crystal composition.

SUMMARY OF THE INVENTION

The present invention has been accomplished in view of the above situation.

The present invention provides an optically active compound represented by the formula (I):

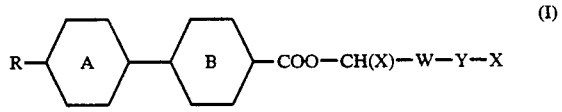

wherein R is a straight or branched chain alkyl or alkoxy group having 1 to 15 carbon atoms,

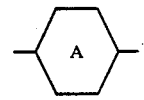

is a 1,4-cyclohexylene or 1,4-phenylene group,

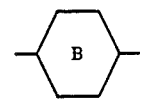

is a 1,4-phenylene or 3-fluoro-1,4-phenylene group, X is a mono-, di- or trifluoromethyl group, W is a straight or branched chain or cyclic alkylene group having 1 to 16 carbon atoms or a straight or branched chain alkenylene group having 2 to 16 carbon atoms, Y is a bond or —COO—, and Z is a straight or branched chain alkyl group having 1 to 8 carbon atoms, a phenyl group or a hydrogen atom.

The present invention further provides a ferroelectric liquid crystal composition comprising at least one optically active compound of the formula (I) and a smectic liquid crystal component, which can exhibit smectic C phase over a wide temperature range around room temperature and high-speed responsiveness.

The present invention further provides a liquid crystal device comprising the above-mentioned ferroelectric liquid crystal composition disposed between a pair of electrodes, which shows good orientation, highly contrasty and bright and has a wide range of operating temperatures and a large capacity.

DETAILED DESCRIPTION OF THE PREFERRED EMBODIMENT

Figure 1:
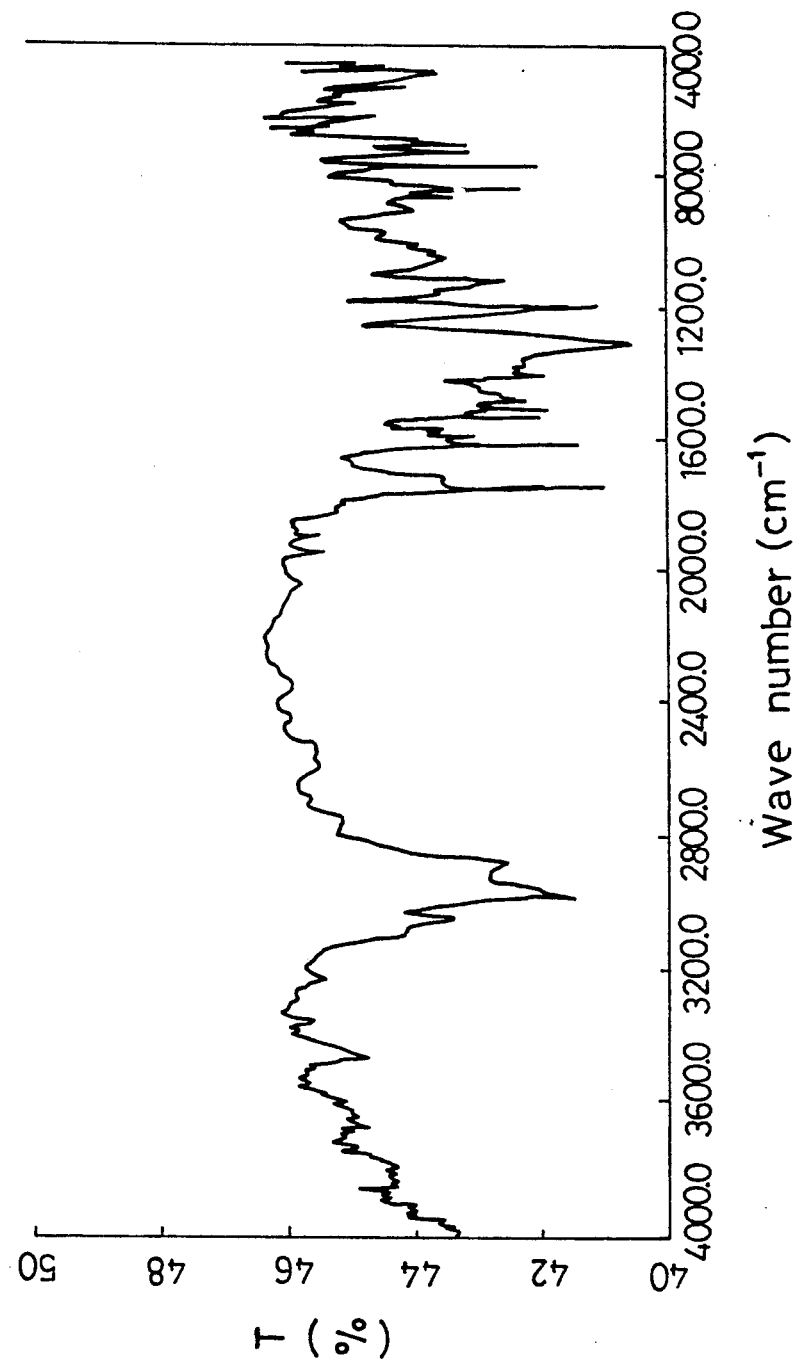
FIGS. 1–4 are an IR absorption spectrum of each of representative optically active compound (I) of the invention.

In the compound (I), the straight or branched chain alkyl group having 1 to 15 carbon atoms with respect to R includes e.g., methyl, ethyl, propyl, isopropyl, butyl, 1- or 2-methylpropyl, t-butyl, pentyl, 1- or 2-methylbutyl, hexyl, 1- or 3-methylpentyl, heptyl, 1- or 4-methylhexyl, octyl, 1-methylheptyl, nonyl, 1- or 6-methyloctyl, decyl, 1-methylnonyl, undecyl, 1-methyldecyl, dodecyl, 1-methylundecyl group, etc. As exemplified by 4-methylhexyl or 6-methyloctyl, the branched chain alkyl may contain an asymmetric carbon atom.

The straight or branched chain alkoxy group having 1 to 15 carbon atoms of R includes e.g., methoxy, ethoxy, propoxy, isopropoxy, butyloxy, isobutyloxy, pentyloxy, 1- or 2-methylbutyloxy, hexyloxy, 1- or 3-methylpentyloxy, heptyloxy, 1- or 4-methylhexyloxy, octyloxy, 1-methylheptyloxy, nonyloxy, 1- or 6-methyloctyloxy, decyloxy, 1-methylnonyloxy, undecyloxy, 1-methyldecyloxy, dodecyloxy, 1-methylundecyloxy group, etc. As exemplified by 3-methylpentyloxy or 4-methylhexyloxy, the branched chain alkoxy group may contain an asymmetric carbon atom.

Preferable combinations of the moiety - A - and the moiety - B - are 1,4-phenylene and 1,4-phenylene, 1,4-cyclohexylene and 1,4-phenylene, 1,4-cyclohexylene and 3-fluoro-1,4-phenylene, and 1,4-phenylene and 3-fluoro-1,4-phenylene.

Examples of the straight or branched chain or cyclic alkylene groups having 1 to 16 carbon atoms of W are:

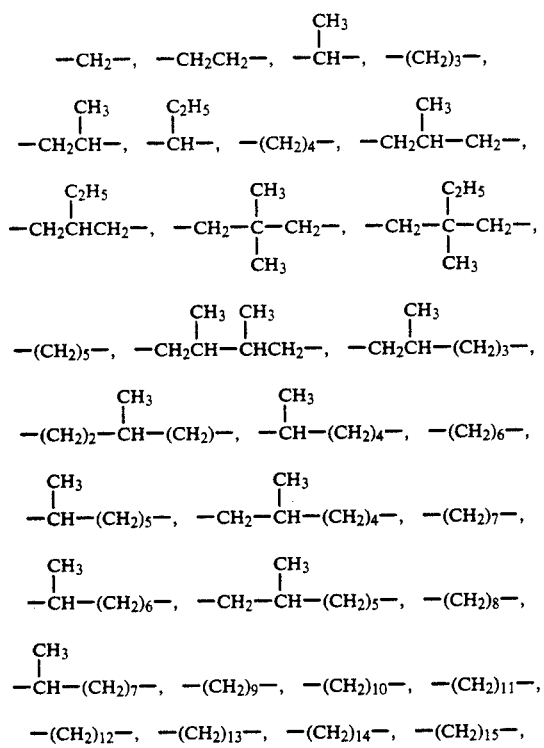

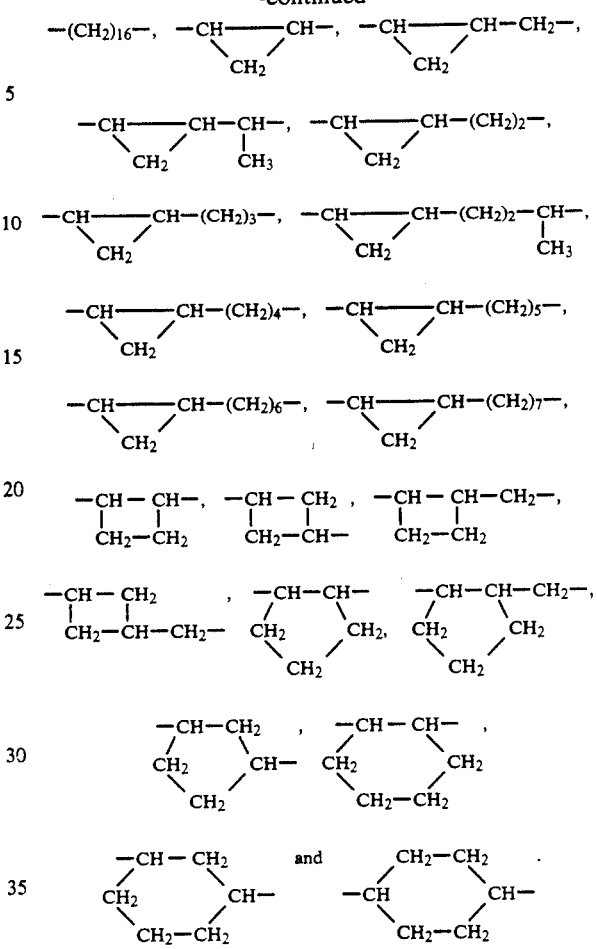

Preferable ones are straight or branched chain or cyclic alkylene groups containing 1 to 9 carbon atoms such as

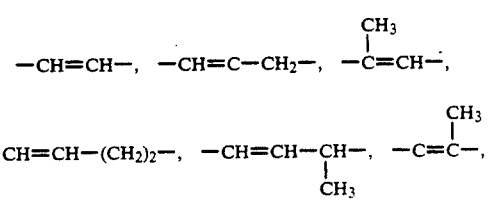

Examples of the straight or branched chain alkenylen groups having 2 to 16 carbon atoms of W are -continued

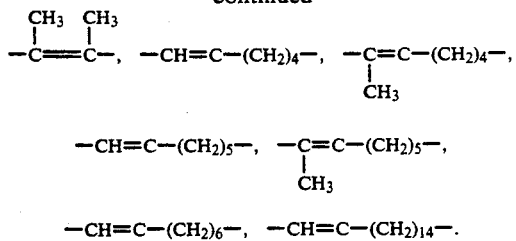

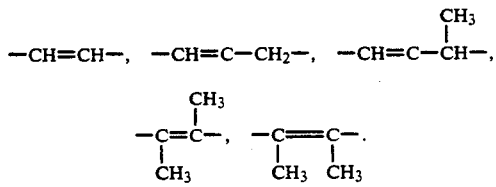

Preferable ones are straight or branched chain alkenylene groups containing 2 to 4 carbon atoms such as

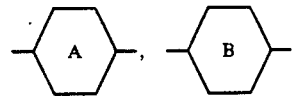

In the above cases, cyclic moiety and double bond in the cyclic alkylene group are preferably positioned as close as possible to an asymmetric carbon atom to which each of the above groups is bonded.

Suitable examples of the combination of W, Y and Z (hereinafter referred to -W-Y-Z group) include e.g., a straight or branched chain alkyl group having 4 to 10 carbon atoms, a phenylalkyl group of which alkylene moiety has a straight or branched chain structure having 2 to 4 carbon atoms. An alkoxycarbonylmethyl group having 4 to 6 carbon atoms, a phenylethenylene group, and an alkylcyclopropylene group of which alkylene moiety has a straight or branched chain structure having 1 to 15 carbon atoms, etc.

The above alkyl group with respect to -W-Y-Z group includes e.g., butyl, 1- or 2-methylpropyl, t-butyl, pentyl, 1- or 2-methylbutyl, hexyl, 1- or 3-methylpentyl, heptyl, 1- or 4-methylhexyl, octyl, 1-methylheptyl, nonyl, 1- or 6-methyloctyl, decyl, 1-methylnonyl, undecyl, 1-methyldecyl, dodecyl, 1-methylundecyl group, etc. Among them, preferable are the alkyl groups containing 6 to 9 carbon atoms such as hexyl, heptyl, octyl, nonyl group.

The above phenylalkyl group of -W-Y-Z includes e.g., phenylethyl, phenylpropyl, phenylisopropyl, phenylbutyl, phenylisobutyl, phenyltert-butyl, etc., Among them, preferable are phenylethyl and phenylbutyl group.

The above alkoxycarbonylmethyl group of -W-Y-Z includes e.g., ethoxycarbonylmethyl, propoxycarbonylmethyl, isopropoxycarbonylmethyl, butoxycarbonylmethyl, isobutoxycarbonylmethyl, tert-butoxycarbonylmethyl group, etc. Among them, preferable are ethoxycarbonylmethyl and butoxycarbonylmethyl group.

The above alkylcyclopropylene group of -W-Y-Z includes e.g., methylcyclopropylene, ethylcyclopropylene, propylcyclopropylene, isopropylcyclopropylene, butylcyclopropylene, 1- or 2-methylpropylcyclopropylene, tertbutylcyclopropylene, pentylcyclopropylene, 1- or 2-methylbutylcyclopropylene, hexylcyclopropylene, 1- or 3-methylpentylcyclopropylene, heptylcyclopropylene, 1- or 4-methylhexylcyclopropylene, octylcyclopropylene, 1-methylheptylcyclopropylene, nonylcyclopropylene, 1- or 6-methyloctylcyclopropylene, decylcyclopropylene, 1-methylnonylcyclopropylene, undecylcyclopropylene, 1-methyldecylcyclopropylene, dodecylcyclopropylene, 1-methylundecylcyclopropylene, etc. Preferable ones are the above hexylcyclopropylene and octylcyclopropylene group.

Hereinafter, the preferred compounds (I) of the invention, which are classified in three main structural categories (i.e., Ia, Ib and Ic), are described.

The first category of the preferred structure of the compounds (I) [hereinafter called the compound (Ia)] is compounds in which R,

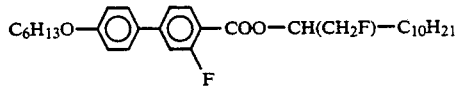

and X are the same meaning as defined above, and -W-Y-Z group is a group selected from the alkyl, the phenylalkyl and the alkoxycarbonylmethyl group.

Examples of the preferred compounds (Ia) are shown in the followings.

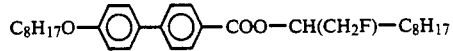

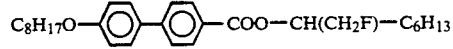

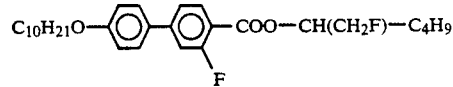

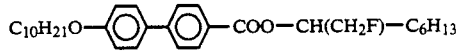

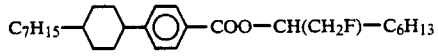

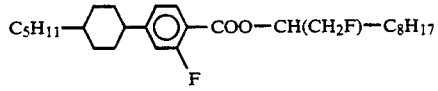

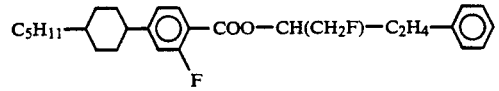

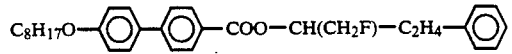

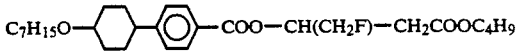

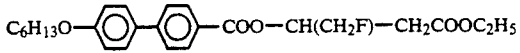

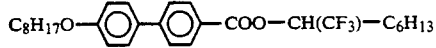

-continued

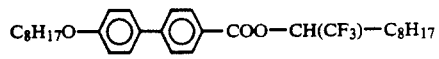
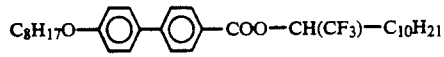
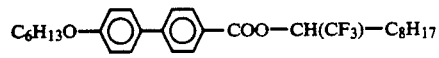
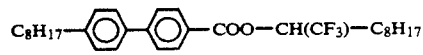
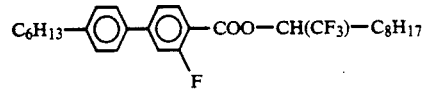
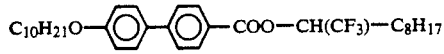
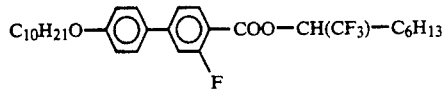
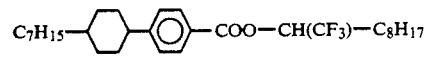
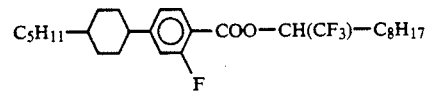
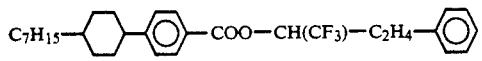
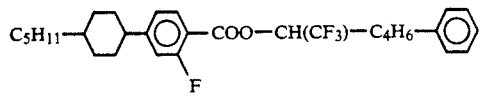

-continued

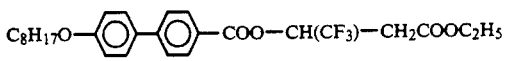
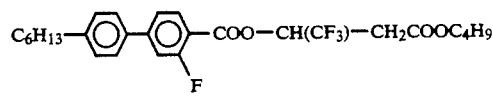
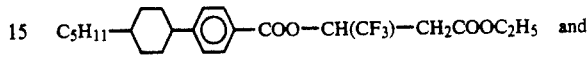
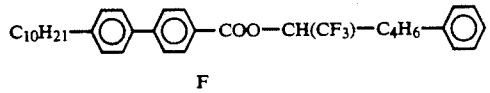

Among the above compounds (Ia), especially desirable are (1S)-1-trifluoromethylheptyl 4-(4'-n-octyloxyphenyl)benzoate, (1S)-1-trifluoromethylnonyl 4-(4'-n-octyloxyphenyl)benzoate and (1S)-1-trifluoromethylnonyl 2-fluoro-4-(4'-n-pentylcyclohexyl)benzoate.

The second category of the preferred structure of the above compounds (I) [hereinafter called the compounds (Ib)] is compounds in which R is the alkoxy group defined above,

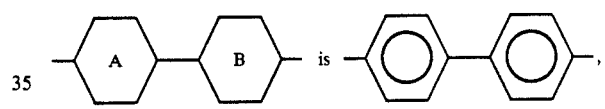

X is —CF₃, and -W-Y-Z group is phenylethenylene.

The compounds (Ib) include the isomers of trans-form and cis-form.

Examples of the preferred compounds (Ib) are shown in the followings.

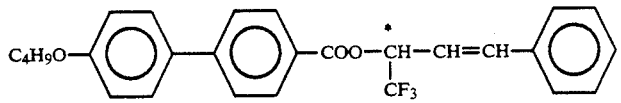
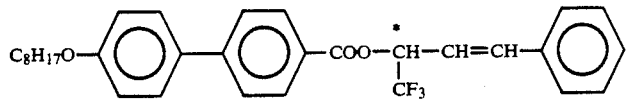
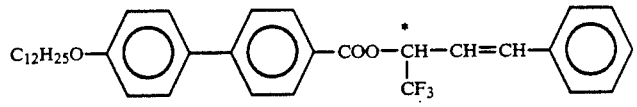
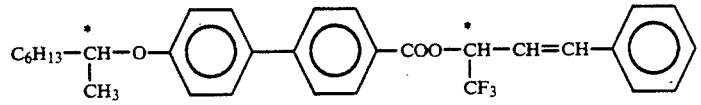
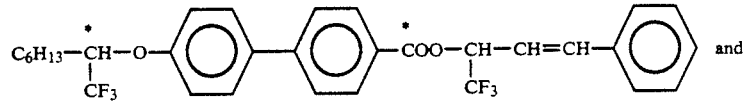

and

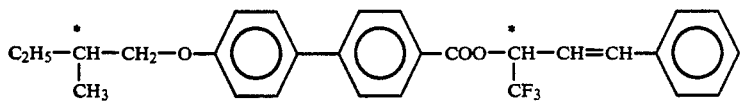

Especially suitable compounds (Ib) are (1S)-1-trifluoromethyl-3-phenyl-(trans)-2-propenyl 4-(4'-n-octyloxyphenyl)benzoate and (IS)-1-trifluoromethyl-3-phenyl-(cis)-2-propenyl-4-(4'-n-octyloxyphenyl) benzoate.

The third category of the preferred structure of the compounds (I) [hereinafter called the compounds (Ic)] is compounds in which R is the alkoxy group defined above,

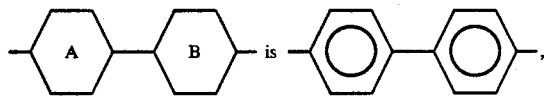

X is —CF$_3$ and -W-Y-Z group is the alkoxycyclopropylene group.

The compounds (Ic) include the isomers of trans-form and cis-form.

Examples of the preferred compounds (Ic) are shown in the followings.

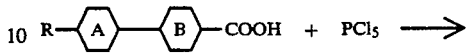

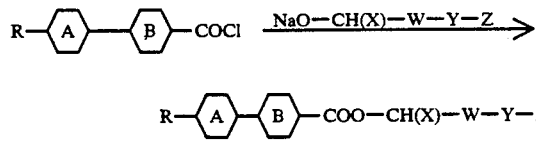

The optically active alcohols to be used in the above synthesis can be synthesized according to e.g., Takashi Tsukamoto, Michinori Takeda, Masazoe Hayashi, Takashi Yamazaki & Tomoya Kitazume, "Fluorine Chemistry Discussion, XIII, Transactions" (1988), 4D, 112.

The sodium salt of the optically active alcohol can be prepared by dissolving the optically active alcohol, for example, in toluene, anhydrous tetrahydrofuran or like solvent, treating the solution with sodium hydride in a

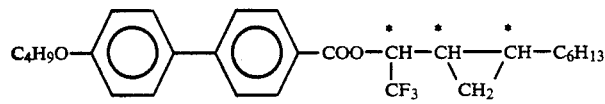

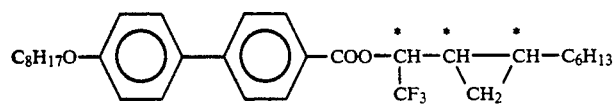

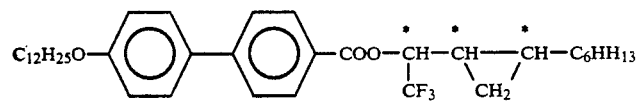

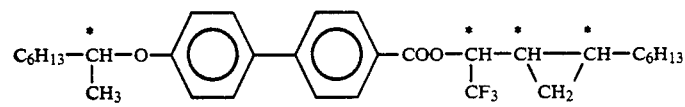

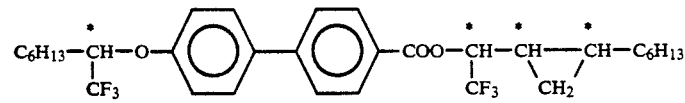

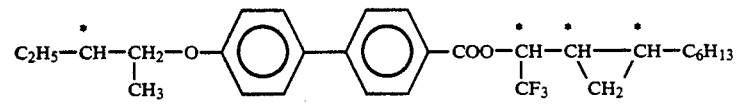

The optically active compounds (I) of the present invention can be obtained e.g. by reacting the corresponding carboxylic acid with phosphorus pentachloride to convert into the carboxylic acid chloride, and reacting the resulting carboxylic acid chloride with sodium salt of an optically active fluoroalcohol according to the following reaction:

stoichimetrically excessive amount, and removing unreacted sodium hydride from the reaction mixture by filtration.

In the above reaction scheme, the carboxylic acid can be prepared, for example, by the method described in Ichiro Nakata and Bunichi Hori, "Process for Preparing Liquid Crystals and Application thereof," Saiwai Shobo (1974). The carboxylic acid chloride is prepared by adding phosphorus pentachloride in a stoichiometrically excessive amount to the carboxylic acid, heating the mixture for reaction and removing POCl₃ and the excess of phosphorus pentachloride from the reaction mixture by vacuum distillation.

The reaction of the carboxylic acid chloride an sodium salt of the optically active fluoroalcohol can be conducted in a solvent (as used for the preapration of said sodium salt) at a temperature in the range of room temperature to about 100° C.

The compound (I) can be isolated by cooling the reaction mixture obtained by this reaction, adding distilled water to the mixture and subjecting the resulting mixture to extraction with a solvent such as ether for purification.

The compound (I), although not always exhibiting a liquid crystal phase, can be used to provide ferroelectric liquid crystal compositions when a suitable quantity of a nonchiral smectic or chiral smectic liquid compound or a mixture of such compounds is added thereto.

It is said that an improved speed of response can be given to ferroelectric liquid crystals when a group having a great dipole moment is present in the vicinity of asymmetric carbon to thereby restrain the free rotation of molecules (see J. S. Patel and J. W. Goodby, Optical Engineering, 26, 373(1987)).

The compound (I) of the present invention contains a mono-, di- or tri-fluoromethyl group having a great dipole moment and bonded to asymmetric carbon and has such structure that the molecule is bendable at or in the vicinity of the asymmetric carbon. Expectedly, therefore, the rotation of the molecules can be limited. It is therefore expected that the compound (I) is potentially highly amenable to spontaneous polarization and can be made to exhibit improved response characteristics by adding thereto a suitable quantity of a liquid crystal compound exhibiting smectic C phase or a mixture of such compounds.

Accordingly, the present invention further provides a ferroelectric liquid crystal composition comprising a smectic liquid crystal compound or a mixture of such compounds, and at least one compound (I).

Useful smectic liquid crystal compounds include a wide variety of those already known in the art, such as the compounds represented by the formulae (i), (ii) and (iii) given below.

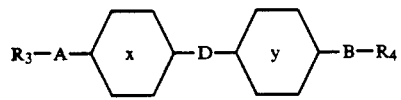
(i)

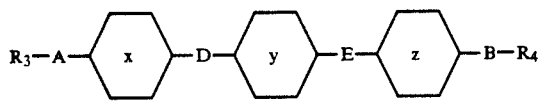
(ii)

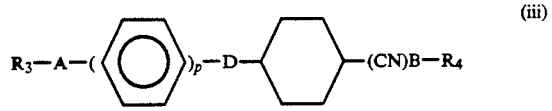
(iii)

wherein A and B are each a single bond or the group —COO—, —OCO—, —CH=CH—COO—, —OCO—CH=CH—, —O—, —S—, —OCOO— or —CO—, D and E are each a single bond or the group —COO—, —OCO—, —CH=N—, —N=CH—, —CH=CH—, —C≡C—, —CH=CH—COO—, —O-CO—CH=CH—, —CH₂CH₂—, —OCH₂—, —CH₂O—, —COS— or —SCO—,

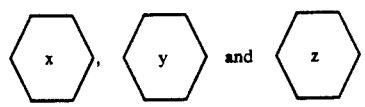

are each independently a group containing a 6-membered ring such as a benzene ring, cyclohexane ring, bicyclo-[2,2,2]-octane ring, pyridine ring, pyrimidine ring, pyrazine ring, pyridazine ring, piperazine ring, pyran ring or dioxacyclohexane ring, the hydrogen atom in the group containing the 6-membered ring being substituted or unsubstituted with a fluorine atom, chlorine atom, bromine atom, cyano group, nitro group, lower alkyl group, lower alkoxy group or heavy hydrogen, $R_3$ and $R_4$ are each independently a straight or branched chain alkyl group having 1 to 15 carbon atoms and containing or not containing an asymmetric carbon atom, and p is an integer of 1 or 2. At least two of these smectic liquid crystal compounds can be used in admixture. Especially, it is desirable to use these smectic liquid crystal compounds in the form of a suitable mixture which will exhibit smectic C phase approximately at room temperature and the phase series of IAC, INAC or the like.

The ferroelectric liquid crystal composition, which comprises smectic liquid crystal compounds or a mixture thereof, and the compound (I), contains the compound (I) usually in an amount of 0.1 to 30 wt. %, preferably 1 to 20 wt. %. If the amount is less than 0.1 wt. %, fully improved responsiveness will not be available, whereas if the amount is over 30 wt. %, the smectic C phase will not have satisfactory thermal stability. Thus, amounts outside the above range are not suitable.

The present invention further provides a liquid crystal device which comprises the ferroelectric liquid crystal composition disposed between a pair of electrodes. With the exception of using the ferroelectric liquid crystal composition of the invention described above, the device can be of known construction and fabricated with use of materials already known in the art, for example, for the light-transmitting electrodes and liquid crystal cell having a liquid crystal orientation film. The liquid crystal device, which is useful as a display device, is advantageously usable also as an optical switching device, liquid crystal shutter or optical logical device.

The present invention will be described in greater detail with reference to the following examples, which, nevertheless, in no way limit the invention.

Preparation of optically active compounds

Example 1

Preparation of (1S)-1-trifluoromethylheptyl 4-(4'-n-octyloxyphenyl)benzoate

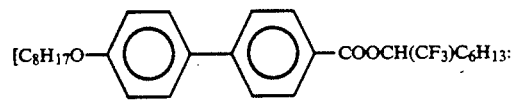

Compound (Ia₁)]

0.4 g (1.9 m mol) of phosphorus pentachloride was added to 0.5 g (1.5 m mol) of 4-(4'-n-octyloxyphenyl) benzoic acid, followed by heating. The reaction mixture was distilled under reduced pressure to remove phosphorus oxychloride and an excess of phosphorus pentachloride. The resulting 4-(4'-n-octyloxyphenyl)benzoyl chloride was dissolved in pyridine, to which 0.28 g (1.5 m mol) of (1S)-1-trifluoromethylheptanol were added. The mixture was allowed to stand for 12 hours at room temperature, raised to 80° C., maintained for 3 hours and cooled. This reaction mixture was then added to an aqueous hydrochloric acid solution and extracted with ethyl ether. The ether layer was washed with an aqueous sodium hydrogen carbonate solution and water, dried over sodium sulfate and distilled to remove the solvent. The residue was purified by a column chromatography, eluting with chloroform to give the title compound [Compound (Ia$_1$)].

The product (Ia$_1$) shows IR spectrum of FIG. 1 and −38.7° of specific rotation [α], is liquid at ordinary temperature, but does not exhibit liquid crystal phase.

EXAMPLE 2

Preparation of (1S)-1-trifluoromethylnonyl 4-(4'-n-octyloxyphenyl)benzoate

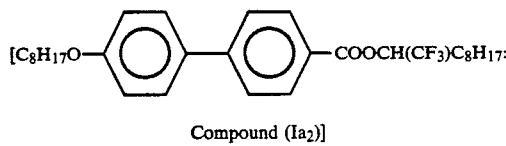

Compound (Ia$_2$)]

The title compound was prepared in the same manner as Example 1, using (1S)-1-trifluoromethylnonanol (0.30g, 1.5 m mol) instead of (1S)-1-trifluoromethylheptanol.

The product (Ia$_2$) shows −21.8° of specific rotation [α], is liquid at ordinary temperature, but does not exhibit liquid crystal phase.

EXAMPLE 3

Preparation of (1S)-1-trifluoromethylnonyl-2-fluoro-4-(4'-n-pentylcyclohexyl)benzoate

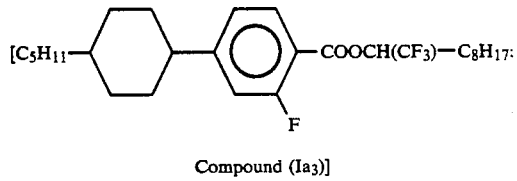

Compound (Ia$_3$)]

The title compound was prepared in the same manner as Example 1 except for using 2-fluoro-4-(4'-n-pentylcyclohexyl)benzoic acid (0.44g, 1.5 m mol) and (1S)-trifluoromethylnonanol (0.32g, 1.5 m mol) instead of 4-(4'-n-octyloxyphenyl)benzoic acid and (1S)-1-trifluoromethylheptanol.

The product (Ia$_3$) shows −26.0° of specific rotation [α], is liquid at ordinary temperature, but does no exhibit liquid crystal phase.

Example 4

Preparation of (1S)-1-trifluoromethyl-3-phenyl-(trans)-2-propenyl 4-(4'-n-octyloxyphenyl)benzoate

-continued
Compound (Ib$_1$)]

0.4g (1.9 m mol) of phosphorus pentachloride was added to 0.5g (1.5 m mol) of 4-(4'-n-octyloxyphenyl)-benzoic acid, followed by heating. The reaction mixture was distilled under reduced pressure to remove phosphorus oxychloride and an excess of phosphorus pentachloride.

On the other hand, 0.05g (2 m mol) of sodium hydride were added to a solution of 0.3g (1.5 m mol) of (1S)-1-trifluoromethyl-3-phenyl-(trans)-2-propene-1-ol in 10 ml of toluene. The mixture was filtered to remove unreactive sodium hydride to give sodium (1S)-1-trifluoromethyl-3-phenyl-(trans)-2-propenoxide.

To this product was added a solution of the above acid chloride in 10 ml of toluene. The mixture was allowed to stand for 12 hours at room temperature, raised to 80° C., maintained for 3 hours as such and cooled. It was then added to distilled water and extracted with ethyl ether. The ether layer was washed with water and dried over anhydrous sodium sulfate. Ethyl ether was removed by distillation, and the residue was purified by a liquid chromatography (column : C18-silica, mobile phase solvent: methanol) to give the title compound (Ib$_1$).

Figure 2:
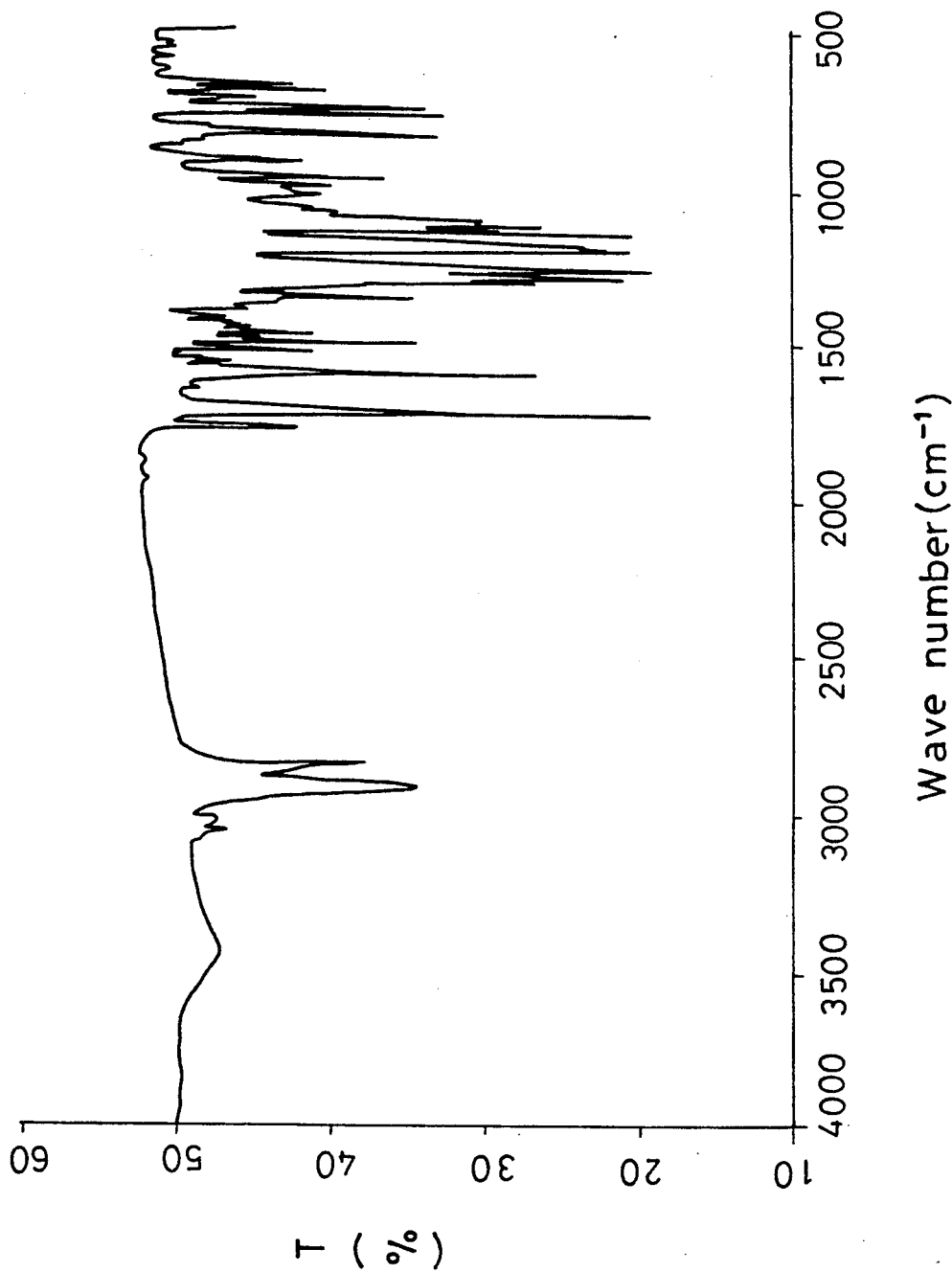

The product (Ib$_1$) shows IR spectrum of FIG. 2, 79° C. of melting point and 108.0° of specific rotation [α], but does not exhibit liquid crystal phase.

Example 5

Preparation of (1R)-1-trifluoromethyl-3-phenyl-(cis)-2-propenyl 4-(4'-n-octyloxyphenyl)benzoate

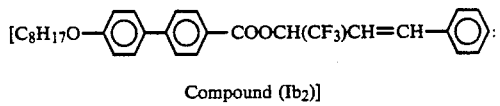

Compound (Ib$_2$)]

The title compound was obtained in the same manner as Example 1 except for using (1R)-1-trifluoromethyl-3-phenyl-(cis)-2-propene-1-ol (0.3g, 1.5 m mol) instead of (1S)-1-trifluoromethyl-3-phenyl-(trans)-2-propene-1-ol.

Figure 3:
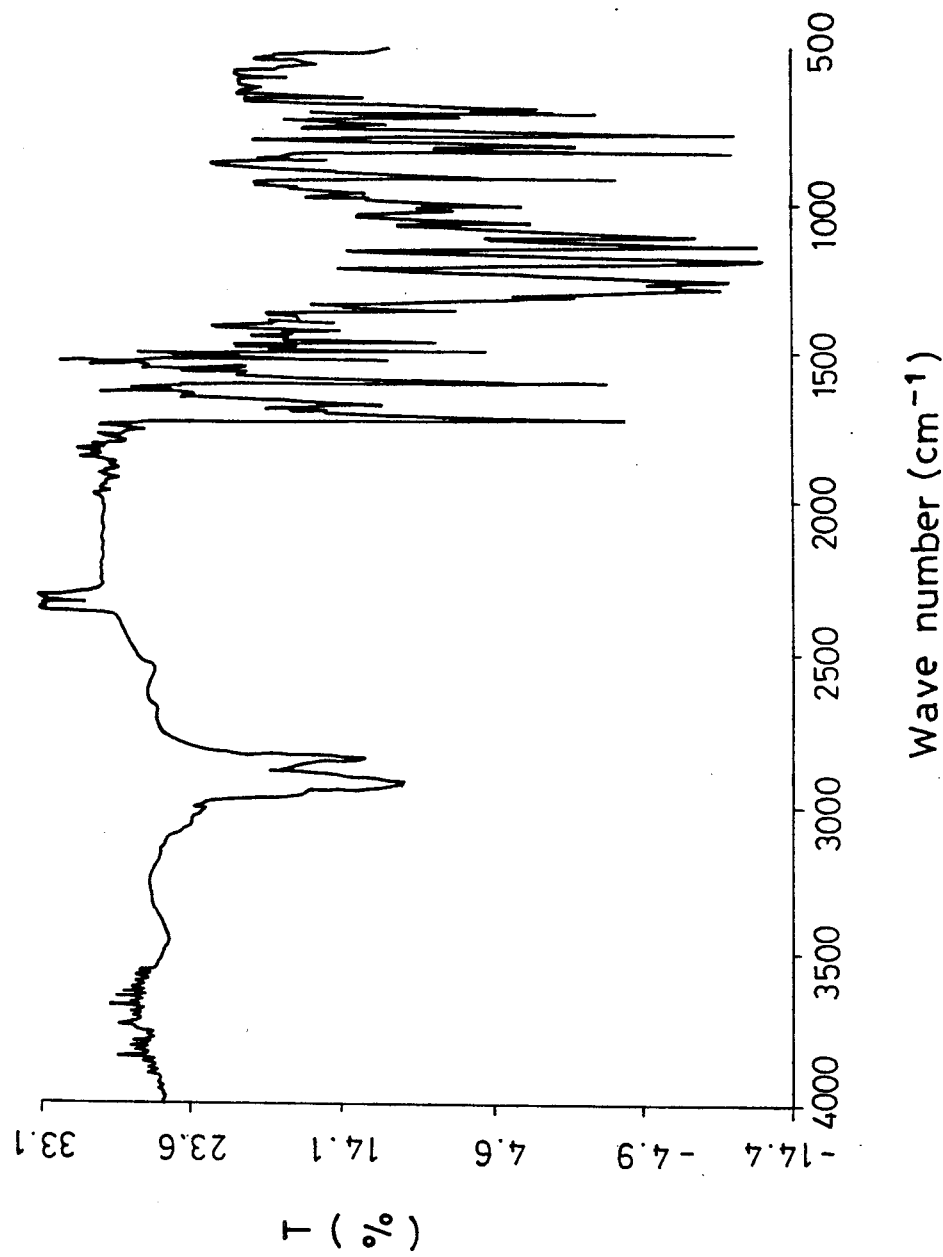

The product (Ib$_2$) shows IR spectrum of FIG. 3, 70° C. of melting point and −185.0° of specific rotation [α], but does not exhibit liquid crystal phase.

Example 6

Preparation of (1R)-2,2,2-trifluoro-1-[2'-hexyl-(1'S, 2'S)-cyclopropyl]ethyl 4-(4'-n-octyloxyphenyl)benzoate

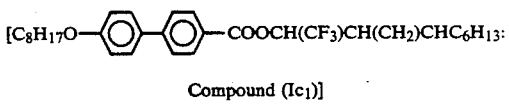

Compound (Ic$_1$)]

0.4g (1.9 m mol) of phosphorus pentachloride was added to 0.5g (1.5 m mol) of 4-(4'-n-octyloxyphenyl)benzoic acid, followed by heating at 80° C.

The reaction mixture was distilled under reduced pressure to remove phosphorus oxychloride and an excess of phosphorus pentachloride thoroughly to give 4-(4'-n-octyloxyphenyl)benzoyl chloride.

Figure 4:
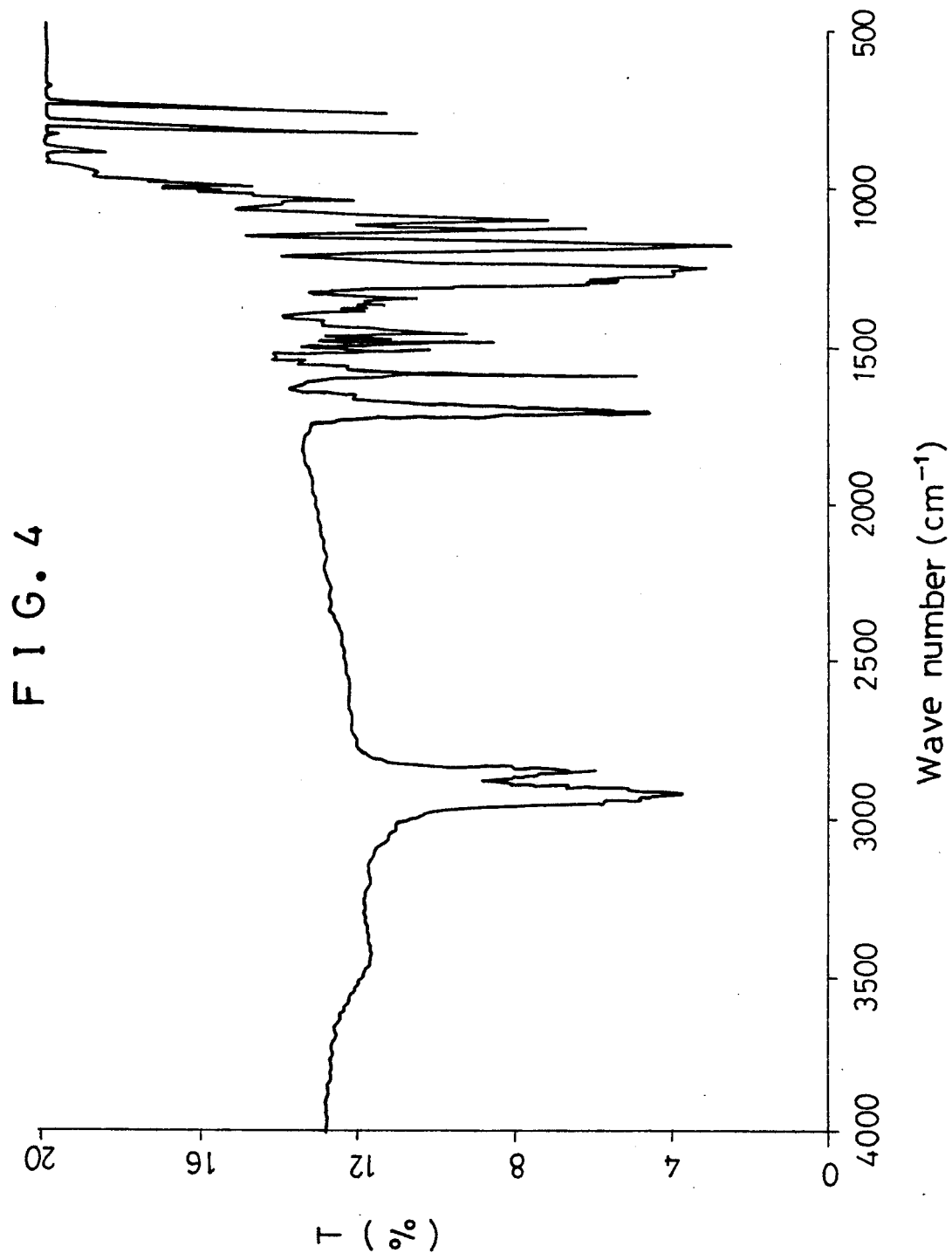

On the other hand, 0.05g (2 m mol) of sodium hydride were added to a solution of 0.3g (1.5 m mol) of (1R)-2,2,2-trifluoro-1-(2-hexyl-(1'S, 2'S)-cyclopropyl) ethanol in 10ml of toluene. The reaction mixture was filtered to remove unreacted sodium hydride to give sodium (1R)-2,2,2-trifluoro-1-(2-hexyl-(1'S, 2'S)-cyclopropyl) ethoxide. To this product was added a solution of the above acid chloride in 10ml of toluene, followed by standing for 12 hours at room temperature. The mixture was raised to 80° C., maintained for 3 hours, cooled, added to distilled water and extracted with ethyl ether. The ether layer was washed and dried over anhydrous sodium sulfate. After removing ethyl ether, the residue was purified by a liquid chromatography (column: C18-silica, mobile phase solvent: methanol) to give the title compound ($Ic_1$). The product ($Ic_1$) shows IR spectrum of FIG. 4, and $-50\ 0°$ of specific rotation [$\alpha$], but does not exhibit liquid crystal phase.

Preparation of liquid crystal compositions and liquid crystal devices

Example 7

A liquid crystal composition ($A_1$) was prepared by mixing 98 w/w % of nonchiral pyrimidine liquid crystal mixture having components and ratios shown in Table 1 with 2 w/w % of (1S)-1-trifluoromethylheptyl 4-(1'-n-octyloxyphenyl)benzoate [Compound ($Ia_1$)] obtained in the above Example 1.

TABLE 1

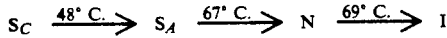

| n | m | Composition (w/w %) |
|---|---|---|
| 7 | 7 | 9.8 |
| 7 | 8 | 4.9 |
| 7 | 9 | 16.7 |
| 8 | 8 | 10.8 |
| 9 | 6 | 12.7 |
| 9 | 9 | 43.1 |

This liquid crystal composition ($A_1$) exhibited smectic C phase, and transition temperatures as follows:

$$S_C \xrightarrow{48°\ C.} S_A \xrightarrow{67°\ C.} N \xrightarrow{69°\ C.} I$$

$S_C$, $S_A$, N and I mean smectic C phase, smectic A phase, nematic phase and isotropic liquid, respectively.

Two glass substrates each was laminated by ITO film electrode, $SiO_2$ insulating film and nylon film in this order. The upper nylon layer was rubbed to make orientation layer. These two substrates were set to make a cell facing their orientation layers each to others, and leaving 2μm clearance between these layers. Liquid crystal composition was injected to the cell. The cell was then heated at 75° C. to change the liquid crystal composition into an isotropic liquid and then cooled to room temperature at the rate of 1° C./min. The resultant cell shows good orientation. Rectangle wave of $V_p-P=20V$ was applied to the cell which was disposed between two polarizers arranged in perpendicular with respect to their axes, thereby observing variations of transmitted light strength. By calculating these variations the response speed was 232 μsec at 25° C. which is fairly superior to that of Reference Example. The tilt angle was 9°.

Example 8

The liquid crystal composition ($A_2$) was prepared in the same manner as Example 7, except for using the compound ($Ia_2$) obtained in Example 2 instead of the compound ($Ia_1$).

The composition ($A_2$) exhibited smectic C phase at room temperature, and transition temperatures as follows:

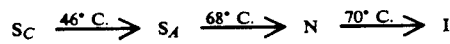

A liquid crystal device was also prepared in the same manner as Example 7. The device exhibited 182 μsec of highly good response speed, and 11° of tilt angle.

Example 9

The liquid crystal composition ($A_3$) was prepared in the same manner as Example 7, except for using the compound ($Ia_3$) obtained in Example 3 instead of the compound ($Ia_1$).

The composition ($A_3$) exhibits smectic C phase at room temperature, and transition temperature as follows:

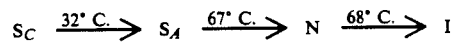

A liquid crystal device was also prepared in the same manner as Example 7. The device exhibits 204 μsec highly good of response speed.

Example 10

A liquid crystal composition ($A_4$) was prepared by mixing 98 w/w % of nonchiral pyrimidine liquid crystal composition shown in the following Table 2 with 2 w/w % of the compound ($Ib_1$) obtained in Example 4.

TABLE 2

| n | m | Composition |
|---|---|---|
| 7 | 7 | 10% |
| 7 | 8 | 5% |
| 7 | 9 | 17% |
| 8 | 8 | 10% |
| 9 | 6 | 13% |
| 9 | 9 | 45% |

The composition ($A_4$) exhibited smectic C phase at room temperature and transition temperatures as follows:

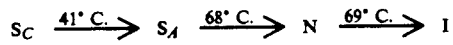

A liquid crystal cell was prepared in the same manner as Example 7 except for using a polyvinyl alcohol film instead of a nylon film. The above composition ($A_4$) was injected into the cell. The cell was then heated at 75° C. to change the liquid crystal composition into an isotropic liquid and then cooled to room temperature at the rate of 1° C./min.

The response speed of the above cell determined by the same method as in Example 7 was 190 μsec at 25° C. The tilt angle was 10.5°.

Example 11

The liquid crystal composition (A₅) was prepared in the same manner as Example 10 except for using the compound (Ib₂) obtained in Example 5 instead of the compound (Ib₁).

The composition (A₅) exhibited smectic C phase at room temperature and transition temperatures as follows:

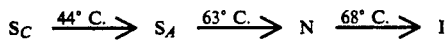

A liquid crystal device was prepared by using the composition (A₅) in the same manner as Example 10, whose response speed was determined to be 330 μsec at 25° C. and tilt angle was 10.5°.

Example 12

A liquid crystal composition (A₆) was prepared by mixing 2 w/w parts of the compound (Ic₁) obtained in Example 6 to 98 w/w parts of the nonchiral pyrimidine liquid crystal composition shown in the following Table 3.

TABLE 3

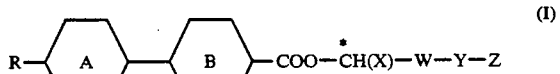

| n | m | Composition |
|---|---|---|
| 7 | 7 | 10% |
| 7 | 8 | 5% |
| 7 | 9 | 17% |
| 8 | 8 | 10% |
| 9 | 6 | 13% |
| 9 | 9 | 45% |

The composition (A₆) exhibited smectic C phase at room temperature and transition temperatures were as follows:

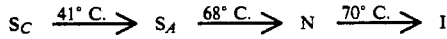

A liquid crystal device was prepared by injecting the liquid crystal composition (A₆) in the same manner as Example 7. The response speed of the device determined by the same method as in Example 7 was 310 μsec at 25° C. The tilt angle was 9.5°.

Comparative Example 1

A liquid crystal composition was prepared in the same manner as Example 7 except for using (1S)-1-methylheptyl 4-(4'n-octyloxyphenyl)benzoate instead of the compound (Ia₁).

The liquid crystal composition exhibited smectic C phase at room temperature and the transition temperature was as follows:

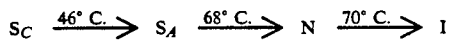

A liquid crystal device was prepared by using the above liquid crystal composition in the same manner as in Example 7, whose response speed was 260 μsec at 25° C. and slightly slow.

What is claimed is:

1. An optically active compound represented by the formula (I):

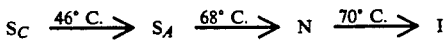

wherein the asterisk indicates the carbon atom to be asymmetric, and wherein R is a straight or branched chain alkyl or alkoxy group having 1 to 15 carbon atoms,

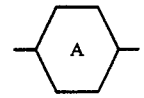

is a 1,4-cyclohexylene or 1,4-phenylene group,

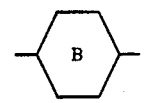

is a 1,4-phenylene or 3-fluoro-1,4-phenylene group, X is a mono-, di or tri-fluoromethyl group, W is a cyclic alkylene group having 3 to 6 carbon atoms or a straight or branched chain alkenylene group having 2 to 16 carbon atoms and further having a double bond at the carbon atom adjacent to said asymmetric carbon atom, Y is a bond or —COO—, and Z is a straight or branched chain alkyl group having 1 to 8 carbon atoms, a phenyl group or hydrogen atom.

2. A compound of claim 1 in which R is a straight or branched chain alkyl group having 5 to 10 carbon atoms.

3. A compound of claim 1 in which R is a straight or branched chain alkoxy group having 6 to 10 carbon atoms.

4. A compound of claim 1 in which X is a mono- or tri-fluoromethyl group.

5. A compound of claim 1 in which R is a straight or branched chain alkoxy group having 1 to 15 carbon atoms, both

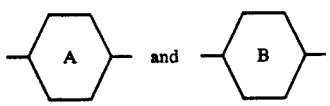

are 1,4-phenylene group, X is trifluoromethyl group, W is ethenylene group, Y is a bond and Z is a phenyl group.

6. A compound of claim 5 in which R is a straight or branched chain alkyl group having 4 to 12 carbon atoms.

7. A compound of claim 5 which is (1S)-1-trifluoromethyl-3-phenyl-(trans)-2-propenyl 4-(4'-n-octyloxyphenyl)benzoate or (1S)-1-trifluoromethyl-3-phenyl-(cis)-2-propenyl 4-(4'-n-octyloxyphenyl)benzoate.

8. A compound of claim 1 in which R is a straight or branched chain alkoxy group having 1 to 15 carbon atoms, both

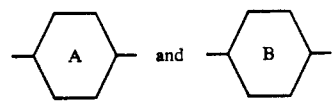

are 1,4-phenylene group, X is trifluoromethyl group, and -W-Y-Z is an alkylcyclopropylene group represented by the following formula:

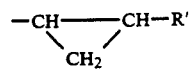

wherein R' is a straight or branched chain alkyl group having 1 to 15 carbon atoms.

9. A compound of claim 8 in which R is a straight or branched chain alkyl group having 4 to 12 carbon atoms and R' is a straight or branched chain alkoxy group having 4 to 12 carbon atoms.

10. A compound of claim 8 which is (1R) -2,2,2-trifluoro-1-[2'-hexyl-(1'S, 2'R)-cyclopropyl]ethyl 4-(4'-n-octyloxyphenyl)benzoate.

11. A ferroelectric liquid crystal composition which comprises at least one optically active compound of claim 1 and a smectic liquid crystal component.

12. A liquid crystal composition of claim 11 in which a smectic liquid crystal component is a nonchiral pyrimidine liquid crystal composition.

13. A liquid crystal composition of claim 11 which contains 0.1 to 30% by weight of at least one optically active compound represented by the formula (I).

14. A liquid crystal composition of claim 11 which contains 1 to 20% by weight of at least one optically active compound represented by the formula (I).

15. A liquid crystal device in which a liquid crystal layer comprising a ferroelectric liquid crystal composition of claim 11 is held between a pair of electrodes.

16. A liquid crystal device of claim 15 in which the liquid crystal layer is formed to 1.0–10 μm thickness.

17. A compound of claim 1 in which W is a straight or branched chain alkenylene group having 2 to 16 carbon atoms.

* * * * *